United States Patent [19]

Stieger

[11] 4,086,766

[45] May 2, 1978

[54] FLUID COUPLING

[76] Inventor: Helmut John Stieger, Langtree Lodge, Cave Road, Brough, North Humberside, England

[21] Appl. No.: 677,115

[22] Filed: Apr. 15, 1976

[30] Foreign Application Priority Data

Apr. 18, 1975 United Kingdom ............ 16176/75

[51] Int. Cl.² ............................................ F16D 33/00
[52] U.S. Cl. ........................................ 60/330; 60/347; 60/364
[58] Field of Search .................. 60/330, 347, 364, 325

[56] References Cited

U.S. PATENT DOCUMENTS

| | | | |
|---|---|---|---|
| 1,540,453 | 6/1925 | Arave | 60/364 |
| 1,746,148 | 2/1930 | Eaton | 60/364 |

FOREIGN PATENT DOCUMENTS

| | | | |
|---|---|---|---|
| 16,785 of | 1912 | United Kingdom | 60/330 |

Primary Examiner—Edgar W. Geoghegan
Attorney, Agent, or Firm—William Anthony Drucker

[57] ABSTRACT

A fluid coupling comprising a first member secured on a first shaft, a second member secured on a second shaft in axial alignment with said first shaft, and an annular fluid race chamber, one of said members having a vaned annulus within said fluid race chamber and the other said member presenting at least one gate into the fluid race chamber, said gate, or each gate, being arranged to allow the vaned annulus of the vaned member to pass relative thereto while obstructing the circumferential flow of fluid along the race chamber and whereby, when the race chamber is charged with fluid and the assembly is rotated, the fluid flows in the race chamber generate to a pressure gradiant acting circumferentially of the axis of rotation to create a pressure difference across the, or each, gate to impart rotation to the gated member.

21 Claims, 8 Drawing Figures

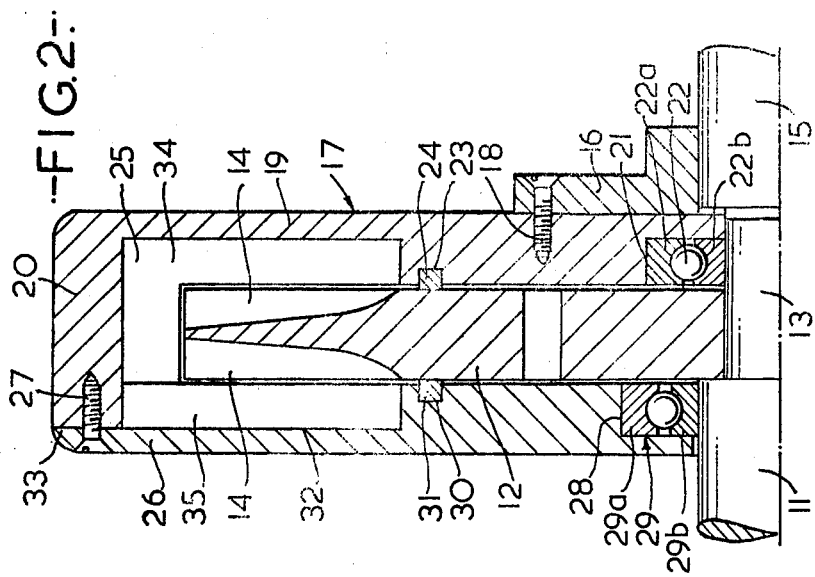
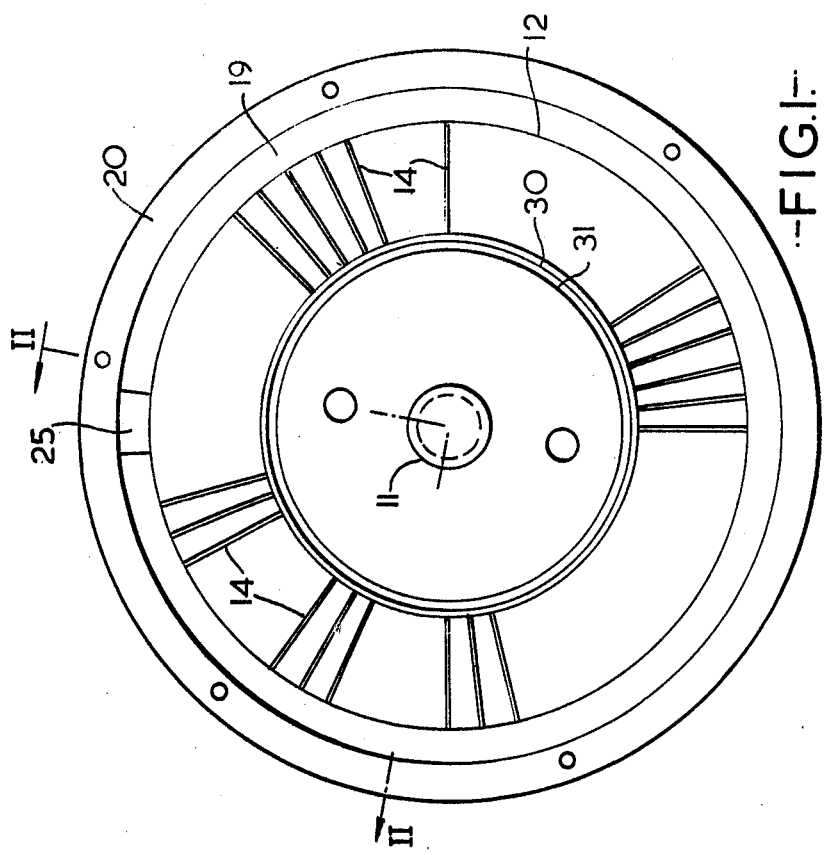

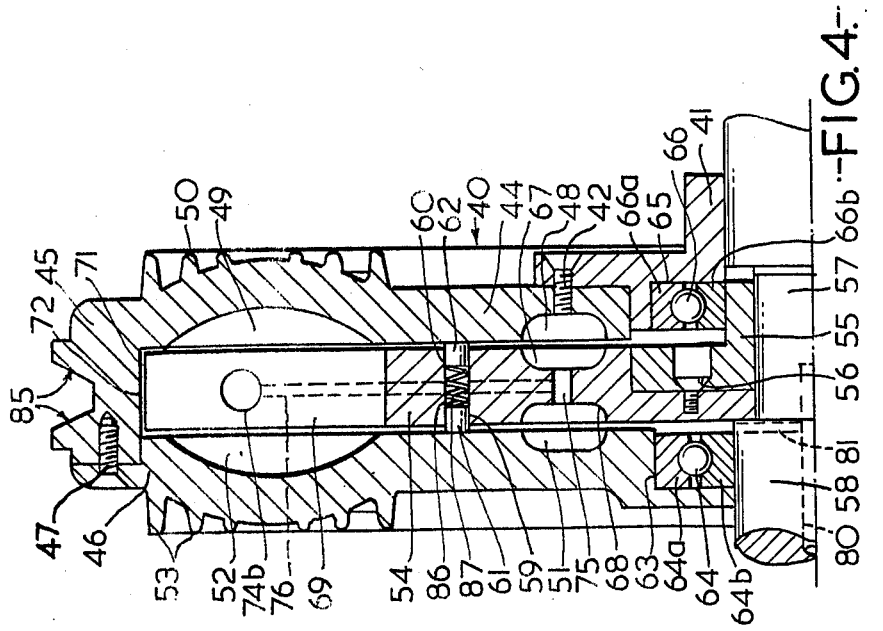
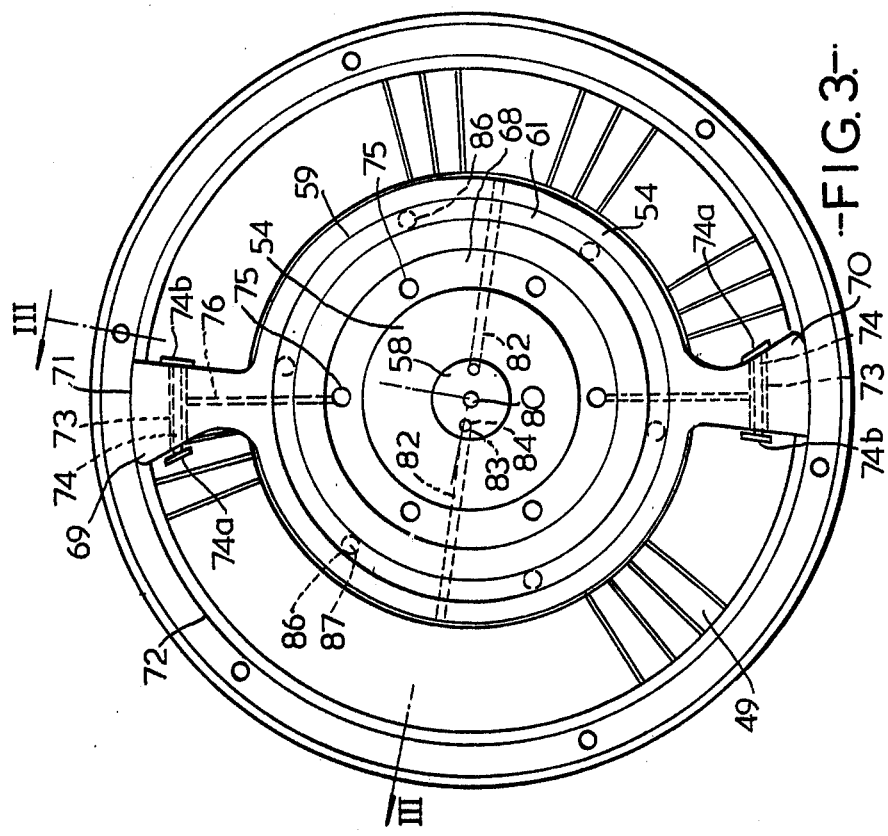

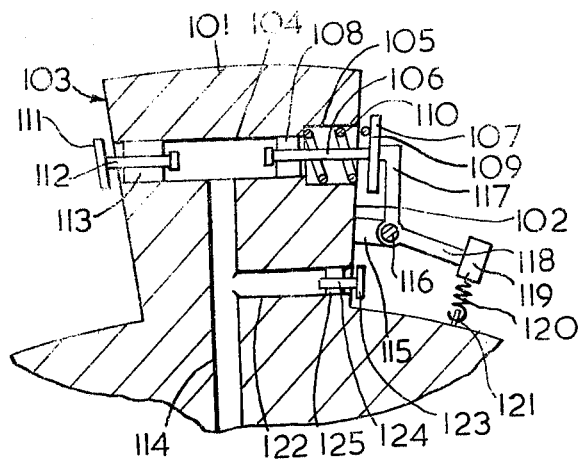
-FIG. 5.-
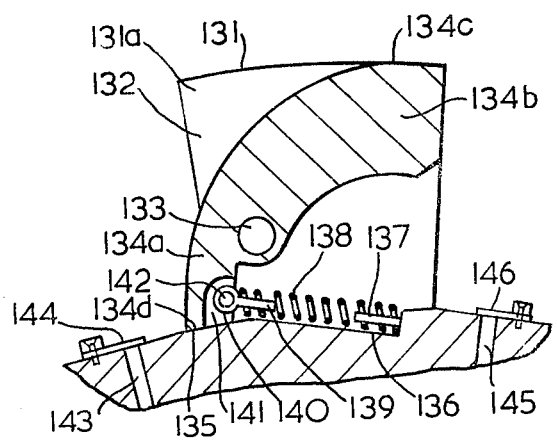
-FIG. 6.-

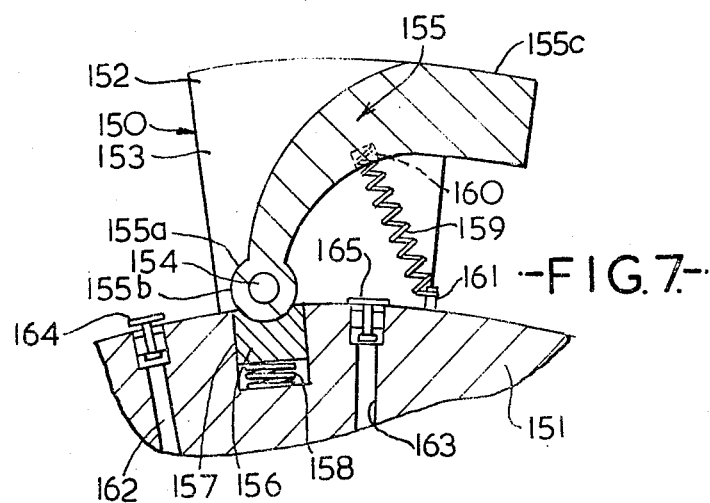
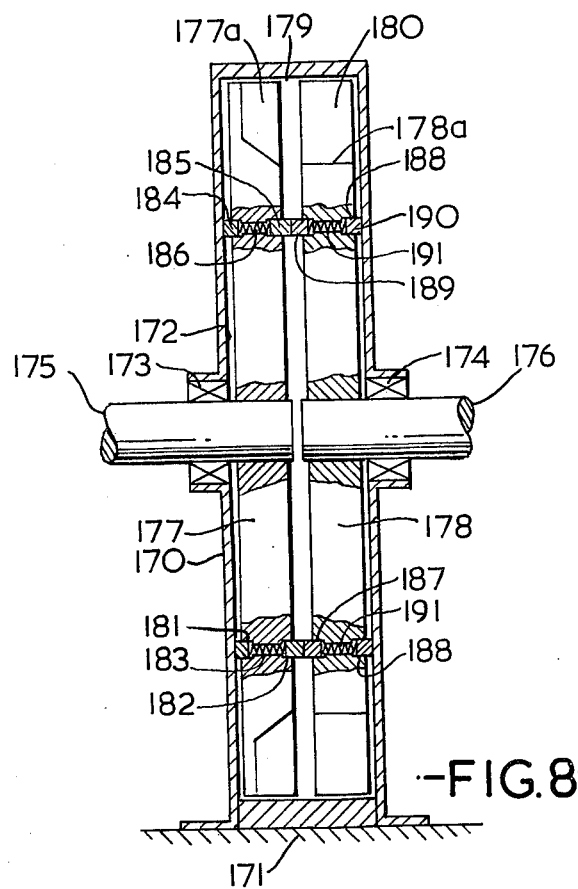

FLUID COUPLING

This invention relates to fluid couplings and has particular application to a fluid coupling capable of being used in a motor vehicle drive-transmission arrangement.

The conventional fluid coupling for vehicle drive-transmission arrangements is a hydrokinetic arrangement derived from the early Vulcan-Sinclair device. In such a coupling an impeller or pump member is mounted on a shaft and rotatable relative to a casing which surrounds the impeller and is secured on a second shaft concentric with the impeller shaft. The impeller runs in an oil chamber defined by the casing and has an annular ring of vanes arranged, when the impeller is rotated, to centrifuge oil between the vanes radially outwardly therefrom. The casing also includes an annular ring of vanes within the oil chamber and oil centrifuged out of the impeller is returned within the chamber vanes for re-entry to the impeller vanes. The outward flow of oil from the impeller thus gives up energy to the casing and the direction of this energy applied to the casing vanes causes the casing to rotate in the same direction as the impeller. When the device works as described above the impeller shaft comprises the input shaft for the coupling and the casing shaft comprises the output shaft but, by simple redesign, the function of the shafts can be reversed so that the casing shaft becomes the input shaft and the impeller shaft becomes the output shaft.

With the above conventional fluid coupling relative rotation between the impeller and the casing causes a generally annular flow of oil around a circular axis lying between the impeller and the casing concentric with the axis of rotation for the coupling and the fluid pressure differences circumferentially of the oil chamber are relatively small for any given rotational speed.

A difficulty with the above described hydrokinetic fluid coupling is that the casing is relatively large and as such is always an inconvenience in engine design, the coupling requires vanes on both the impeller and the casing, and thereby the device is expensive to manufacture and maintain. Further, to obtain torque multiplication, a further member is required.

It is well known in the art to work liquid within a so-called "hydrostatic" pump and the conventional Vortex pump is one example of such pumps.

In a Vortex pump a stationary casing defines an annular liquid race chamber and a rotor within the casing presents a vaned annulus within the race chamber. A liquid inlet opens to the race chamber and a liquid outlet smaller than the inlet opens to the race chamber close to but circumferentially spaced from the liquid inlet. The casing presents a fixed gate which projects into the race chamber between the inlet and outlet duct opening and is arranged to allow the rotor to pass thereby, with the minimum clearance, while preventing circumferential flow of liquid thereby.

When the rotor is rotated the vanes of the vaned annulus work on the liquid in that part of the race chamber not obstructed by the gate, said vanes impart velocity energy to the liquid and, as the circumferential flow of liquid is obstructed by the gate and the only outlet is a relatively small outlet duct, a pressure gradient is created within the race chamber, increasing from the location adjacent the low pressure duct opening towards the high pressure duct opening and, in practice, liquid pressures in excess of 200 lbs. can be obtained from an atmosphere pressure supply in a relatively modestly sized unit.

It should be observed that, contrary to the hydrokinetic arrangements and wherein a radial pressure difference is generated in the race chamber with relatively small circumferential pressure differences the hydrostatic device, in providing a plurality of vanes acting on the liquid in that part of the fluid chamber not obstructed by the gate, creates essentially a substantial circumferential pressure difference.

The present invention seeks to provide a fluid coupling, capable of being used in a motor vehicle drive transmission arrangement and which avoids many of the defects found in the conventional hydrokinetic devices.

According to the present invention there is provided a hydrostatic fluid coupling comprising a first member secured on a first shaft, a second member secured on a second shaft in axial alignment with said first shaft, and an annular fluid race chamber, one of said members having a vaned annulus within said fluid race chamber, the other said member presenting at least one gate into the fluid race chamber, said gate, or each gate, being arranged to allow the vaned annulus of the vaned member to pass relative thereto whilst obstructing the circumferential flow of fluid along the race chamber and said vaned annulus being arranged to present a plurality of vanes in the, or each, part of the race chamber not obstructed by the gate or gates whereby, when the race chamber is charged with fluid and the assembly is rotated, the vanes act on the fluid in the race chamber to generate a pressure gradiant acting circumferentially of the axis of rotation and increasing in the direction of rotation to create a pressure difference across the, or each, gate to impart rotation to the gated member.

In one embodiment in accordance with the invention the vaned member comprises a disc-like form with a vaned annulus in one radial face and the gated member also comprises a disc-like form with the, or each gate projecting radially therefrom, the first and second members being rotatable within a fixed casing.

In an alternative embodiment in accordance with the invention one of said members comprises a casing and the other member comprises a displaceable member within the casing.

According to preferred embodiment of the present invention there is provided a hydrostatic fluid coupling comprising a casing member, secured on a first shaft, and a displaceable member, within said casing member, secured on a second shaft concentric with said first shaft, a fluid race chamber defined between said casing and said displaceable member, a vaned annulus presented in the race chamber by one of said members, and a gate presented by the other member to obstruct the circumferential flow of fluid in said race chamber.

The vaned annulus preferably has vanes of the vortex pump configuration, that is to say vanes which, when working in an annular fluid race chamber in a casing, engage and re-engage the fluid to create a circulatory or "vortex" flow in the chamber to create a pressure difference in the circumferential direction of the race chamber. Thus, the vaned annulus envisaged by the present invention, when working in combination with the gate, creates fluid pressure gradients in the race chamber with the pressure increasing towards the gate in the direction of rotation of the vaned annulus.

In one embodiment in accordance with the invention the displaceable member comprises an impeller and the vaned annulus is defined by the impeller. The gate is secured with the casing and the arrangement may have a general configuration and operation of its parts similar to the arrangement expected from a vortex pump with its inlet and outlet ducts closed.

Thus, as the impeller rotates relative to the casing a fluid pressure gradient is established in the race chamber with the pressure increasing towards the gate in the direction of rotation of the impeller relative to the casing.

In an alternative arrangement in accordance with the invention a vaned annulus is formed on opposing internal surfaces of the casing defining the race chamber and the displaceable member has the form of a disc, the outer periphery of which defines the internal circumferential boundary for the race chamber, with a radial protrusion forming the gate.

Preferably annular fluid sealing rings are arranged between the displaceable member and the casing to allow the volume defined by the casing radially inwardly of the sealing rings to be maintained at a substantially constant pressure, conveniently atmospheric pressure. Conveniently, said volume radially inwardly of the sealing rings is charged with fluid at low pressure relative to the operational pressure in the race chamber and said pressure fluid constitutes a reservoir for supplying low pressure fluid to the low pressure end of the pressure gradient in the race chamber.

Preferably a fluid duct is provided between the low pressure volume within the sealing rings and the low pressure side of the gate and, when the displaceable member is rotatable in either direction relative to the casing, a fluid duct is provided from the said low pressure volume to each race chamber face of the gate and a valve is provided for closing the duct to the gate face defining the high pressure end of the race chamber.

The driving shaft for the coupling may conveniently comprise the shaft having the displaceable member secured thereon in which case the casing comprises the driven member but the casing may constitute the driving member, in which case the shaft secured to the displaceable member will comprise the driven shaft.

Preferably only one gate is provided but the coupling may include more than one gate and it will be appreciated that the member presenting the gate or gates may have counterweight means to balance the gate or gates.

In one embodiment in accordance with the invention the fluid volumes within the casing are sealed. In an alternative arrangement the fluid volume radially inwardly of the sealing rings may communicate with a fluid source externally of the casing.

In a preferred embodiment in accordance with the invention the casing includes cooling fins, the fluid is oil, and the fluid volume radially within the sealing rings communicates with the oil sump of a prime mover driving the coupling. By this means hot oil from the sump may circulate through the casing to be cooled thereby so that the coupling acts as an oil cooler for the prime mover.

In one embodiment in accordance with the invention the, or each, gate is maintained out of contact with the surfaces on the other part or parts of the coupling defining the race chamber whereby the gated member is rotated only by the effects of the pressure difference across the, or each, gate.

In another arrangement in accordance with the invention the gated member includes one or more friction shoes, conveniently defined by the, or each, gate, adapted, when the gated member is rotated above a predetermined speed, to frictionally engage the vaned member whereby, above the said predetermined speed, the vaned member and the gated member are frictionally locked together for mutual rotation.

The invention will now be described further by way of example with reference to the accompanying drawings in which:

FIG. 1 shows a front view of a fluid coupling with the side plate removed.

FIG. 2 shows a cross-section, on an enlarged scale, on the line II—II in FIG. 1, FIG. 3 shows a front view of a second embodiment for a fluid coupling, with the side plate removed, FIG. 4 shows a cross-section, on an enlarged scale, on the line III—III in FIG. 3, FIG. 5 shows a detailed cross-sectional side view through a gate including an arrangement for reducing power transmission at low speeds.

FIG. 6 shows a detailed cross-sectional side view through an alternative gate construction to that shown in FIG. 5, FIG. 7 shows a detailed cross-sectional side view through a third gate construction and FIG. 8 shows a transverse cross section through a third embodiment of coupling in accordance with the invention.

In the embodiment illustrated in FIGS. 1 and 2 a drive shaft 11 has a vortex pump type impeller 12 mounted on its reduced end portion 13 and the vanes of impeller 12 are identified by numeral 14. A driven shaft 15, axially aligned with but axially spaced from the shaft 11, has a flanged member 16 secured thereon and an annular casing 17 is secured on the flanged member 16 by screws 18.

The casing 17 comprises a radial wall 19 with a peripheral flange 20 extending substantially parallel to the axis of shafts 11 and 15. The radial wall 19 includes, in its radial face remote from member 16, a recess 21, in which a bearing 22 is housed, a recess 23 in which a sealing ring 24 is housed, and a recess 25 which partially defines a race chamber for the coupling. The recesses 21, 23, 25 and peripheral flange 20 are all concentric with the axis of shaft 15 and the outer ring 22a of bearing 22 is secured in the recess 21 whilst the inner ring 22b of the bearing 22 is secured on the reduced end portion 13 of shaft 11 whereby the casing 19 is partially supported by, but rotatable independently of, the shaft 11.

The impeller 12 is located within casing 17 with that radial face adjacent radial wall 19 of the casing engaged against the sealing ring 24, and the open end of casing 17 is closed by an end plate 26 secured to the flange 20 by screws 27. The end plate 26 presents, on its radial face adjacent the impeller, an annular recess 28 in which a bearing 29 is housed, the inner race 29b of the bearing is secured on shaft 11, and the outer ring 29a is secured in recess 28 whereby the plate 26 is supported by, but rotationally independent of, the shaft 11. The radial face of end plate 26 adjacent the impeller 12 also includes coaxial recesses 30, in which a sealing ring 31 is located, and a recess 32 which partially defines the race chamber for the coupling.

In practice, the coupling will include a gasket 33 between end plate 26 and casing 17 to form a fluid tight joint therebetween and an oil seal (not shown) for preventing oil leakage between plate 26 and shaft 11. The casing 17 will also include a filler means (not shown) for charging the coupling with fluid.

In operation, with the casing 17 charged with fluid, e.g. oil, a drive applied to shaft 11 will cause impeller 12 to rotate within the casing and end plate assembly 17, 26. The impeller vanes 14 will work on the oil in the race chamber, defined between the recesses 25 and 32, peripheral flange 20, and the impeller 12 at the root of vanes 14, but with the device described thus far the rotation of impeller 12 within the casing assembly 17, 26 would merely produce oil flow within the race chamber in the direction of rotation of the impeller 12.

However, in the illustrated coupling, the casing 17 includes a radial wall 34 within the recess 29 and extending axially within peripheral flange 20 and the end plate 26 also includes a radial wall 35 within recess 32. When the end plate 26 is correctly aligned with and secured to casing 17 the walls 34 and 35 co-operate to form a gate which allows the impeller 12 to pass therethrough with a minimum of clearance, but totally obstructs the circumferential fluid flow within the race chamber. Thus, when the coupling is operating, the circumferential flow of fluid is obstructed by the gate and the action of the vanes 14 on the fluid in the race chamber creates a pressure gradient in the fluid.

The pressure gradient established circumferentially within the race chamber has its low pressure end, which may be at or below atmospheric pressure, acting on one face of the gate 34, 35 and its high pressure end which may be in excess of 200 p.s.i., acting on the other face of the gate 34, 35 so that a resultant torque is applied to the casing assembly 17, 26 urging rotation of said assembly 17, 26 in the direction of rotation of the impeller 12. The magnitude of the torque transmitted will, as is well known in the vortex pump art, depend upon the dimensions of the parts acting on the oil and the rotational speeds of the parts and pressure differences applied to the opposite faces of the gate 34, 35, in excess of 200 p.s.i. can be readily obtained.

It will be appreciated that some leakage of fluid past the seals 24 and 31 will occur and the fluid passing the seals 24 and 31 will charge the free volumes within casing assembly 17, 26 radially inwardly of the seals 24 and 31. The low pressure volumes of oil can be returned to the race chamber, when the device is operating, via a duct (not shown) between said low pressure volume and the low pressure side of the gate 34, 35. Thus, when the device is operating, fluid in the said low pressure volumes will be sucked into the low pressure end of the race chamber to maintain said chamber filled with fluid. A one way valve (not shown) may be fitted in the duct to allow fluid flow in said duct only from the low pressure volumes to the race chamber.

In the embodiment shown in FIGS. 3 and 4 a casing 40 is attached to a flanged member 41 by screws 42 and the flanged member 41 is secured on a shaft 43. The casing 40 comprises a radial wall 44 with an axially extending flange 45 and the open end of the casing 40 is closed by an end plate 46 secured to casing 40 by screws 47. The radial wall 44 presents, on its face remote from flanged member 41 and in radially spaced relationship concentric with the axis of shaft 43, an annular recess 48, and an annular vaned portion 49 wherein the vane tips lie in the plane of said face and the roots of the vanes define concave recesses in said face. The external face of the casing 40, that is to say the face adjacent flanged member 41, has cooling fins 50 protruding therefrom in radial alignment with the annular vaned portion 49.

The end plate 46 presents, on that face directed towards the radial wall of casing 40, an annular recess 51, radially aligned with recess 48, and an annular vaned portion 52 aligned with, and arranged as, a mirror image of the vaned portion 49. The external face of end plate 46 also includes annular cooling fins 53 on its surface radially aligned with the cooling fins 50.

A displaceable member 54 is secured to a flanged member 55 by screws 56 and member 55 is secured on the reduced end 57 of a shaft 58 axially aligned with, but spaced from the shaft 43. The member 54 also includes annular recesses 59 and 60 in which sealing rings 61 and 62 are respectively located.

The end plate 46 also includes a recess 63 within which the outer ring 64a of bearing 64 is secured and the inner ring 64b of the bearing 64 is secured on shaft 62 so that plate 46 is supported by but rotatable relative to, the shaft 62. The flanged member 41 also includes a recess 65 within which the outer ring 66a of a bearing 66 is secured and the inner ring 66b of bearing 66 is secured on the flanged member 59 so that casing 40 is supported on, but rotatable relative to, the shaft 62.

The displaceable member 54 is located between radial wall 44 and end plate 46. Said member 54 has a generally disc-like configuration with annular recesses 67 and 68 facing recesses 48 and 51 respectively, and the sealing rings 61 and 62 are in sliding sealing engagement with the adjacent internal faces of radial wall 44 and end plate 46 to effectively seal the volumes radially inwardly of the rings 61 and 62 from the volume radially outwardly of the rings 61 and 62, which latter volume is to define the race chamber for the coupling.

The disc displaceable member 54 has a generally outer diameter less than the smallest diameter of the vaned portions 49 and 52, with two diametrically opposite radial protrusions 69 and 70 which define gates for the race chamber. Each gate 69 and 70 has its radially outermost surface 71 close to, but in running clearance with, the bore of the casing 40 defined by the internal surface 72 of axially extending flange 45, and a width in close, but running clearance to the tips of the vanes in the vaned portions 49 and 52.

Each gate 69 or 70 has a bore 73 passing between its faces intended to define the ends of the fluid chamber forming the race chamber and a valve spindle 74 is slidably disposed in said bore. The spindle 74 carries a closure member 74a, 74b at each of its ends and the bore 73 is grooved longitudinally to allow fluid flow along the bore irrespective of the axial location of the spindle 74. The recesses 67 and 68 are connected by bores 75 and a bore 76 extends from each bore 73 to a bore 75 whereby the bore 73 in each gate 69 or 70 communicates with the free volume radially inwardly of the sealing rings 61 and 62.

In operation, and with the casing assembly 40, 46 charged with fluid, conveniently oil, drive applied to the casing assembly 40, 46 via shaft 43 urges relative rotation between casing assembly 40, 46 and displaceable member 54, the rotation of assembly 40, 46 causes vaned portions 49 and 52 to work on the oil in the race chamber urging circumferential flow, the circumferential flow in the race chamber is almost totally obstructed by the gates 69 and 70 and a pressure gradiant is thereby built up in each arcuate fluid volume between the gates 69 and 70 with the high pressure end of each gradiant in the direction of rotation of the casing assembly 40, 46.

The pressure gradiant in each arcuate fluid volume creates a pressure difference on the opposing faces of each gate 69 and 70 and such pressure differences apply torque to the displaceable member urging rotation of said member, and thereby the shaft 58, in the direction of rotation of the casing assembly 40, 46. If the two arcuate fluid volumes between gates 69 and 70 have the same circumferential length the pressure differences acting across the gates 69 and 70 will be the same, the pressure differences acting on each gate will be urging rotation in the same direction and, of course, the displaceable member will be balanced.

When each gate 69 and 70 has applied thereto a high pressure fluid on one side and a low pressure fluid on its opposite side, the valve spindle 74 is slidably displaced by the pressure differences to move the valve closure 74a or 74b on the high pressure side to a closure position and the valve closure 74a or 74b on the low pressure side to an open position. This allows oil to be sucked from the oil filled volume radially within sealing rings 61 and 62 along bore 76 into bore 73 for release past the open valve closure 74a or 74b into the low pressure end of the race chamber. Thus, oil leaking past the oil sealing rings 61 and 62 from the race chamber is continuously replenished with oil from the volume radially within the rings 61 and 62.

When now a deceleration is applied to casing assembly 40, 46 the vaned portions 49 and 52 urge displacement of the oil in the opposite direction to the direction of rotation of the displaceable member 54, the pressure gradients in the arcuate fluid chambers are reversed, and a decelerating torque is applied to the displaceable member 54. With a reversal of the pressure gradients the valve spindle 74 in each gate 69 and 70 is slidably displaced by the pressure differences so that the previously closed valve closure 74a or 74b is moved to an open condition and the previously opened valve closure 74a or 74b is moved to a closed position so that the low pressure ends of the oil volumes in the race chambers are again connected to the oil supply in the volume radially within rings 61 and 62.

With the FIGS. 3 and 4 embodiment the fins 50, 53 are effective in cooling the casing, and thereby the oil in the casing assembly 40, 47 and thus the coupling can act as an oil cooler. When the fluid coupling is located adjacent a prime mover, the coupling may be charged with oil from the sump of the prime mover via a duct 80 in shaft 58 and a radial duct 81 connecting duct 80 in shaft 58 to the low pressure volume within casing assembly 40, 47. A return flow from the casing assembly to the prime mover is readily obtained in the FIGS. 3 and 4 embodiment by providing a duct 82 extending from the mid-length region of each race chamber through the displaceable member 54 to a radial bore 83 in shaft 58 which bore 83 communicates with a bore 84 parallel to but spaced from the bore 80. Thus, oil can be discharged from each race chamber via the duct 82, bore 83 and bore 84 associated with that race chamber and, at the prime mover end, the bores 84 can discharge directly into the sump via radial bores spaced from the intake opening to the bore 80.

Thus, with a fluid coupling arranged as illustrated in FIGS. 3 and 4 hot oil from the prime mover sump is drawn along duct 80 and released through radial duct 81 into the low pressure volume radially within sealing rings 61 and 62, the hot oil is sucked from said low pressure volume through a bore 75, bore 76 into a bore 73 and released through the open end of the bore 73 into the low pressure end of the race chamber. The oil is cooled in the race chamber and cooled oil is discharged from the race chambers via ducts 82, and returned to the sump whereby an oil circulation system with oil cooling is obtained.

It will be appreciated that the location of the openings to ducts 82 along the length of the race chamber will be selected in dependance upon the dimensions of the parts, the intended speed for the coupling, and the desired rate of flow through the oil circulation system and whilst the discharge of oil from the race chamber must be at a higher pressure location than the oil feed to said chamber, to overcome centrifugal force on the radially flowing oil, the discharge should be effected to interfere as little as possible with the pressure gradient in each race chamber.

As in the FIGS. 1 and 2 embodiment the FIGS. 3 and 4 embodiment can transmit energy with the drive applied to the shaft 58 or with the drive applied to the shaft 43. Alternatively the axially extending flange 45 may have a peripheral V groove, illustrated by numeral 85, which can be engaged by a V belt to drive, or take-off drive from, the casing assembly 40, 46.

It will be observed that on the FIGS. 3 and 4 embodiment the sealing rings 61 and 62 are supported by the displaceable member 54 and in this arrangement the member 54 has bores 86 connecting the grooves 59 and 60 for the sealing rings 61 and 62 and coil compression springs 87 in bores 86 arranged to resiliently urge the sealing rings 61 and 62 against end plate 46 and radial wall 44 respectively. This resilient loading of the sealing rings may of course be included in the FIGS. 1 and 2 embodiment by providing bores in the radial wall 19 and end plate 26 to receive coil springs arranged to act on the sealing rings 24 and 31 to resiliently load said rings against the member 12.

It will be appreciated that the efficiency of the coupling is related to the efficiency of the gate in obstructing fluid flow therethrough and in one embodiment in accordance to the invention the gate, or gate elements defining the gate, may include sealing strips, preferably inclined to avoid striking the vane elements, and perhaps resiliently loaded towards the vaned elements to exclude the circumferential flow of fluid therethrough other than the fluid between the vanes.

It has been found in practice that under certain operating conditions a fluid coupling constructed in accordance with this invention produces an output torque in excess of the input torque, the reason for the torque multiplication is at least partially dependent upon secondary flows within the race chamber, and it is believed that careful design of the race chamber to induce desired secondary flows will allow different torque multiplication factors to be obtained without additional members, as is required by conventional hydrokinetic arrangements.

With a fluid coupling of the type shown in FIGS. 1 and 2 or FIGS. 3 and 4 the relative rotation between the casing and the displaceable member increases as the rotational speed of the assembly and the fluid pressure difference reduces but, even at relatively low rotational speeds, the coupling can still transmit drive and such drive transmission can be disadvantageous in vehicle transmission systems where a "no-drive" condition is desirable at low or idling speeds. This disadvantage can be overcome by providing communication between the high and low pressure sides of the, or each, gate when the coupling is "idling" and FIGS. 5, 6 and 7 show arrangements permitting such communication.

In FIG. 5 a gate 101 has faces 102 and 103, a bore 104 passes through the gate 101 to connect faces 102 and 103 and the end of bore 104 adjacent face 102 is counterbored to define a recess 105. A spindle 106 for a valve closure member 107 is slidably disposed in a spider bearing 108 and supports closure member 107 axially aligned with counterbore 105. The closure member 107 presents a closure face 109 which, in one extreme position of the closure member 107 closes the open end of counterbore recess 105 and in the other extreme position for the closure member 107, is spaced from the face 102 to open the end of counterbore recess 105. A coil compression spring 110 seats in recess 105 and acts on the closure face 109 of the valve closure member 107 to urge said face 109 away from its duct closure position.

At the end of bore 104 adjacent face 103 a valve closure member 111 has a fixed spindle 112 slidably disposed in a spider bearing 113 and, in one extreme position, the valve closure member 111 seats against face 103 to close that end of the bore 104.

A bore 114 connects bore 104 with a fluid volume within the sealing rings (not shown) for the coupling.

A bracket 115 integral with the gate 101, supports a pivot pin 116 for a bell crank lever having one arm 117 engageable with the valve closure member 107 and its other arm 118 weighted, as by a mass 119, and extending in the direction of the race chamber. A coil tension spring 120 connects mass 119 to a fixed position 121 on the gate bearing member.

In the condition wherein the coupling is rotating at operational speed to transmit drive, with the face 102 exposed to a high fluid pressure and face 103 exposed to a lower fluid pressure, the closure member 107 is exposed to the high pressure in the adjacent part of the race chamber, and the arm 118 with weight 119 are subject to centrifugal force so as to urge anti-clockwise rotation of the bell crank lever (as viewed in FIG. 5) against the action of spring 120, and the resultant force acting on closure member 107 causes the closure member to be displaced to its extreme left-hand position (as viewed in FIG. 5) against the action of spring 110, and the closure face 109 of member 107 seats against gate face 102 to close the right-hand end of bore 104. As the pressure in bore 104 falls, the closure member 111 exposed to the low pressure in the race chamber adjacent face 103 and with the higher pressure in bore 104 acting on it, is displaced to its maximum position away from face 103 so that fluid can flow from the volume radially within the sealing rings, along bore 114, and along bore 104 through the spider bearing 113 to the low pressure end of the race chamber.

If, from the operational condition transmitting drive, the coupling is subjected to conditions of low torque transmission whilst the rotational speed is still above idling speed, e.g. 600 rpm as may be the case of a drive transmission in a vehicle travelling downhill, the pressure differences across the gate 101 will fall but the bell crank lever arm 118 with weight 119 is still affected by the high rotational speed and arm 118 with weight 119 subjected to a centrifugal force sufficient to overcome the resistance of springs 110 and 120 to maintain the valve closure member in a closure condition.

If now from the operational condition transmitting drive the coupling is brought to a low rotational speed for a no-drive condition, as when the vehicle is idling, the centrifugal force acting on arm 118 with weight 119 is insufficient to overcome the forces exerted by springs 110 and 120 so that the bell crank lever is rotated clockwise (as viewed in FIG. 5) and the valve closure member 107 unseats from face 102 to allow open communication through the bore 104. With the valve closure member 107 unseated high pressure fluid flows through recess 105, through spider bearing 108, along bore 104 and through spider bearing 113 to maintain valve closure member 111 in open condition to allow fluid flow from bore 104 into the low pressure end of the race chamber adjacent face 103. With the open bore 104 through gate 101 the drive transmission through the coupling is substantially reduced and "creep" of a vehicle at idling speed is thereby avoided.

It will be appreciated that the speed at which the closure member 107 opens the bore 104 will depend upon the effect of springs 110 and 120 and the mass of arm 118 with weight 119 and by selecting springs of a desired length and extension, the bore may be opened and closed at any desired condition for the coupling.

It will be observed that in FIG. 5 a bore 122 connects bore 114 with the race chamber adjacent face 102 via a pressure sensitive valve comprising a valve closure member 123 a spindle 124 for which is slidably retained in a spider bearing 125. When the coupling is rotating and the pressure adjacent face 102 is higher than the pressure in bore 114 the valve closure member 124 will seat against face 102 to close bore 122.

If now, in a reverse pressure situation whereby the high pressure end of the race chamber lies adjacent face 103 and the low pressure end of the face chamber lies adjacent face 102, the bore 104 will be at a lower pressure than the race chamber adjacent face 103 so that valve closure member 111 will seat against face 103 to close the left hand end of bore 104. At the same time the fluid pressure in bores 114 and 122 will be greater than that at the face 102 so that valve closure member 123 unseats from face 102 and the low pressure end of the race chamber communicates with bore 122 whereby fluid can flow from bore 122 into the low pressure end of the race chamber.

In the embodiment illustrated in FIG. 6 a gate 131 has a slot 132 extending therethrough in the direction of the race chamber. The slot 132 thus lies between two cheeks, only one of which cheek 131a is shown. The cheeks are bored to support a pivot pin 133 parallel to the rotational axis of the coupling and a valve closure member 134 is pivotally supported on pin 133 and has a width only slightly less than the width of slot 132 to limit the flow of fluid therebetween.

The closure member 134 has, on that side of pivot pin 133 intended to be the low pressure end of the race chamber, (left hand side as viewed in FIG. 6) a short arm 134a of low mass and on the other side of pivot pin 133 an arm 134b of greater mass. The arm 134b has a peripheral surface 134c which lies close to the greater diameter limit of the race chamber when a stop surface 134d on arm 134a engages on a surface 135 constituting part of the bottom of slot 132, to define an anticlockwise rotational limit for member 134 as viewed in FIG. 6.

A recess 136 is formed in the bottom of slot 132 and a fixed pin 137 projects into recess 136. A coil compression spring 138 is located on the pin 137 and the free end of spring 138 is captive by a pin 139 integral with an annular head 140, said pin 139 being entered into the open end of spring 138. The annular head 140 is located in a slot 141 in the arm 134a and a pivot pin 142, supported by arm 134a, passes through annular head 140, to pivotally retain said head 140. In operation, as when the coupling is rotating at speed to transmit drive, the arm 134b is subjected to greater centrifugal force than arm 134a and this force, in combination with the fluid pressure difference across the gate, causes closure member 134 to rotate anti-clockwise (as viewed in FIG. 6) to compress spring 138 and to adopt a closure condition with the surface 134d resting on surface 135 so that in this condition closure member 134 closes the slot 132 and fluid flow circumferentially past the gate is substantially obstructed.

Whilst running at normal operational speed with the high pressure end of the race chamber on the right hand side of the gate (as viewed in FIG. 6) the low pressure end of the race chamber is in open communication with the volume or volumes within the coupling by way of duct 143 via a cantilever spring valve member 144. A duct 145 communicating with the said low pressure volumes is closed from the high pressure end of the race chamber by a leaf valve member 146.

If now whilst rotating at high speed the load transmitted is reduced, as by a vehicle running downhill, the pressure differences across the gate falls but the centrifugal force acting on the large mass side 134b of closure member 134 maintains member 134 in its closure condition.

If now the rotational speed falls so that the coupling is idling at low revolutions under a no-load condition, the pressure difference across the gate is small and the force in spring 138 overcomes the reduced centrifugal force acting on closure member 134 whereby said member 134 rotates clockwise (as viewed in FIG. 6) to open the slot 132 to allow fluid to flow through the gate from the high pressure end of the race chamber through slot 132, to the low pressure end of the race chamber. Thus, once again, circumferential fluid flow through the open gate substantially eliminates force transmission through the coupling.

In the embodiment illustrated in FIG. 7 a gate 150, projecting from the periphery of a disclike member 151, has a slot 152 circumferentially therethrough and with cheeks 153 (only one of which is shown), defining the slot 152 therebetween, supporting a pivot pin 154 parallel to the rotational axis for the coupling. A closure member 155 is located in slot 152 and has a width only slightly smaller than the width of slot 152 whereby to limit the flow of fluid between the sides of closure member 155 and the cheeks 153.

The closure member 155 has a generally arcuate configuration with one end 155a defining the bearing end and through which the pivot pin 154 passes. The bearing end 155a presents an arcuate surface 155b concentric with the axis of pin 154, and a pressure pad 156, housed in a recess 157 in the disc-like member 151, engages the arcuate surface 155b and is loaded against said surface 155b by a coil compression spring 158 within recess 157.

The member 155 extends from the bearing end 155a, increasing in thickness therefrom to increase the mass on the right-hand side of the axis of pivot pin 154 (as shown in FIG. 7) and a coil tension spring 159 extends between an anchor pin 160, secured to member 155, and an anchor pin 161 secured to the disc-like member 151. The closure member 155 presents an arcuate surface 155c, the curvature of which is identical with the maximum diameter of the race chamber, and surface 155c is so disposed relative to the bearing end 155a that, in an extreme anti-clockwise position for closure member 155 the surface 155c contacts the internal surface defining the maximum diameter of the race chamber. The surface 155c is preferably arranged, or is coated or lined with a material different from the closure member 155, to obtain a high co-efficient of friction with the internal surface defining the maximum diameter of the race chamber when said surface 155c is loaded against said internal surface.

Ducts 162 and 163 extend from a low pressure volume or volumes radially within the race chamber and open to the race chamber on the left and right-hand side respectively of the closure member 155 (as shown in FIG. 7). Said ducts 162 and 163 are closable by valve members 164 and 165 respectively, which valves 164 and 165 open only when the fluid pressure in their respective ducts 162 or 163 exceeds the fluid pressure in the region of the race chamber into which the valve member 164 or 165 opens.

With the coupling arrangement illustrated in FIG. 7 rotating at low speed to define an "idling" no-drive condition the centrifugal force acting on the closure member 155 is small and is overcome by the tension in spring 159 so that the closure member 155 is rotated clock-wise from the position shown in FIG. 7 to allow fluid flow through the slot 152 and thereby drive transmission through the coupling is eliminated.

When now the rotational speed of the coupling increases above the "idling" speed the centrifugal force acting on member 155 increases to progressively overcome the tension of spring 159 and the member 155 is displaced anti-clockwise (as viewed in FIG. 7) to progressively close the slot 152 until, at a pre-determined speed, the surface 155c contacts the internal diameter defining the maximum diameter for the race chamber, at which point the slot 152 is fully closed and the fluid flow through the gate is eliminated. Thereafter, a pressure difference is created circumferentially of the race chamber and the gate is subjected to a pressure difference as described hereinbefore. It should be observed that when the closure member 155 is closing the slot 152 the pressure pad 156 acting on surface 155b prevents fluid flow between member 155 and the base of the slot 152.

As the rotational speed increases the centrifugal force acting on the member 155 increases and thereby the pressure between surface 155c and the surface defining the maximum diameter for the race chamber increases whereby said surfaces become frictionally locked for mutual rotation. Thus, as the speed of rotation of the coupling increases, the coupling passes from the no-drive condition through a fluid drive condition to a fluid and friction drive condition.

In the coupling construction shown in FIG. 8 a casing 170, fixed to a base surface 171, defines a closed annular chamber 172 and houses bearings 173 and 174, which support shafts 175 and 176 in axial alignment and co-axially arranged with respect to chamber 172. A rotary member 177 within annular chamber 172 is secured on shaft 175 and a rotary member 178 within annular chamber 172 is secured on shaft 176.

The rotary member 177 has a substantially disc-like configuration with its maximum diameter only slightly less than that of the internal surface 179 defining the maximum diameter of the annular chamber 172. The rotary member 178 has a general diameter 178a substantially less than the diameter of rotary member 177 but said member 178 presents a radially projecting gate 180 from diameter 178a, the outer peripheral surface of which gate 180 lies substantially at the same diameter as the periphery of member 177. The members 177 and 178 can thus rotate within annular chamber 172 close to, but without contacting, the internal surface 179 of casing 170.

The rotary member 177 presents, in its radial face adjacent member 178, an annular vaned region 177a which extends from an inner diameter, substantially equal to the general diameter 178a, to the periphery of member 177. Said member also includes an annular concentric groove 181 in its radial surface remote from member 178, an annular groove 182, of identical diameter to groove 181, in its radial surface adjacent member 178, and through bores 183 circumferentially spaced apart and passing axially through the member 177 to connect grooves 181 and 182. An annular sealing member 184 is located in groove 181, an annular sealing member 185 is located in groove 182, and coil compression springs 186 in bores 183 urge the annular sealing members 184 and 185 outwardly from the member 177. In like manner, the member 178 includes annular grooves 187 and 188 concentric with grooves 181 and 182, annular sealing members 189 and 190 are located in grooves 187 and 188 and are urged outwardly by coiled compression springs 191 in through bores 192, and the annular sealing members 181 and 190 effectively isolate the volumes of casing 170 radially inwardly of said members 181 and 190 from the volume radially outwardly of said members whilst the sealing members 182 and 189 effectively isolate the volume between members 177 and 178 radially inwardly from said sealing members 182 and 189 from the volume outwardly therefrom. Thus, the volume radially outwardly of sealing members 181, 182, 189 and 190 can be placed under pressure whilst the volume inwardly thereof is at a lower pressure.

In operation, and with the casing 170 charged with fluid, conveniently oil, drive is applied to the shaft 175 to rotate the rotary member 177 within casing 170 whereby the vaned annulus on member 177 works on the oil outwardly of the sealing members 181, 182, 189 and 190 to create a pressure difference in the circumferential direction of the race chamber defined by the oil volume radially outwardly of the diameter 178a of member 178. The circumferential pressure difference in the race chamber creates a pressure difference across the gate 180 whereupon the rotary member 178 is caused to rotate to drive the shaft 176. Thus, in the above described arrangement the shaft 175 represents the input or drive shaft, and the shaft 176 represents the take-off or driven shaft. It will be appreciated that the member 178 may have more than one gate and the, or each, gate may be constructed in identical manner to the gate illustrated in FIGS. 1, 3, 5 or 6, of the drawings and include ducts for introducing oil from the volumes radially within sealing members 184, 185 and 189 and 190 to the low pressure end of the race chamber as described with respect to the FIGS. 3, 5 and 6 embodiments.

What I claim is:

1. A hydrostatic fluid coupling comprising a first member secured on a first shaft, a second member secured on a second shaft in axial alignment with said first shaft, and an annular fluid race chamber, one of said members having a vaned annulus within said fluid race chamber, the other said member presenting at least one gate in the fluid race chamber, said gate, or each gate, being arranged to allow the vaned annulus of the vaned member to pass relative thereto whilst obstructing the circumferential flow of fluid along the race chamber and said vaned annulus being arranged to present a plurality of vanes in the, or each, part of the race chamber not obstructed by the gate or gates whereby, when the race chamber is charged with fluid and the assembly is rotated, the vanes act on the fluid in the race chamber to generate a pressure gradient acting circumferentially of the axis of rotation and increasing in the chamber of rotation to create a pressure difference across the, or each, gate to impart rotation to the gated member.

2. A hydrostatic fluid coupling as claimed in claim 1 in which the first and second members are rotatably supported by their respective shafts within a fixed casing.

3. A hydrostatic fluid coupling as claimed in claim 1 in which one of said members comprises a casing and the other said member comprises a displaceable member within the casing.

4. A fluid coupling as claimed in claim 1, in which the gated member presents more than one gate and said gates are equally spaced circumferentially within the race chamber.

5. A fluid coupling as claimed in claim 1 in which annular sealing means are provided between the casing and the member or members therein, said sealing means being located adjacent the radially innermost limits of the race chamber.

6. A fluid coupling as claimed in claim 5 in which the casing and/or the displaceable member or members define one or more volumes radially within the sealing means.

7. A fluid coupling comprising a first member secured on a first shaft, a second member secured on a second shaft in axial alignment with said first shaft, and an annular fluid race chamber, one of said members having a vaned annulus within said fluid race chamber and the other said member presenting at least one gate in the fluid race chamber, said gate or each gate being arranged to allow the vaned annulus of the vaned member to pass relative thereto whilst obstructing the circumferential flow of fluid along the race chamber and whereby, when the race chamber is charged with fluid and the assembly is rotated, the fluid flows in the race chamber generate a pressure gradient acting circumferentially of the axis of rotation to create a pressure difference across the, or each, gate to impart rotation to the gated member, annular sealing means being provided between the casing and the member or members therein, said sealing means being located adjacent the radially innermost limits of the race chamber, the casing and/or the displaceable member or members defining one or more volumes radially within the sealing means, said volume or volumes being maintained substantially at atmospheric pressure when the fluid race chamber is charged with fluid and the coupling is rotating.

8. A fluid coupling comprising a first member secured on a first shaft, a second member secured on a second shaft in axial alignment with said first shaft, and an annular fluid race chamber, one of said members having a vaned annulus within said fluid race chamber and the other said member presenting at least one gate in the fluid race chamber, said gate or each gate being arranged to allow the vaned annulus of the vaned member to pass relative thereto whilst obstructing the circumferential flow of fluid along the race chamber and whereby, when the race chamber is charged with fluid and the assembly is rotated, the fluid flows in the race chamber generate a pressure gradient acting circumferentially of the axis of rotation to create a pressure difference across the, or each, gate to impart rotation to the gated member, annular sealing means being provided between the casing and the member or members therein, said sealing means being located adjacent the radially innermost limits of the race chamber, the casing and/or the displaceable member or members defining one or more volumes radially within the sealing means, said volume or volumes being connected to a fluid source via a duct in one of said shafts.

9. A fluid coupling comprising a first member secured on a first shaft, a second member secured on a second shaft in axial alignment with said first shaft, and an annular fluid race chamber, one of said members having a vaned annulus within said fluid race chamber and the other said member presenting at least one gate in the fluid race chamber, said gate or each gate being arranged to allow the vaned annulus of the vaned member to pass relative thereto whilst obstructing the circumferential flow of fluid along the race chamber and whereby, when the race chamber is charged with fluid and the assembly is rotated, the fluid flows in the race chamber generate a pressure gradient acting circumferentially of the axis of rotation to create a pressure difference across the, or each, gate to impart rotation to the gated member, annular sealing means being provided between the casing and the member or members therein, said sealing means being located adjacent the radially innermost limits of the race chamber, the casing and/or the displaceable member or members defining one or more volumes radially within the sealing means, a duct or ducts being provided to connect said volume or volumes with the race chamber adjacent the, or each, gate at that part, or each part, of the race chamber intended to be at low pressure when the coupling is operating.

10. A fluid coupling comprising a first member secured on a first shaft, a second member secured on a second shaft in axial alignment with said first shaft, and an annular fluid race chamber, one of said members having a vaned annulus within said fluid race chamber and the other said member presenting at least one gate in the fluid race chamber, said gate or each gate being arranged to allow the vaned annulus of the vaned member to pass relative thereto whilst obstructing the circumferential flow of fluid along the race chamber and whereby, when the race chamber is charged with fluid and the assembly is rotated, the fluid flows in the race chamber generate a pressure gradient acting circumferentially of the axis of rotation to create a pressure difference across the, or each, gate to impart rotation to the gated member, and means sensitive to pressure differences across the, or each, gate and adapted to open a communication duct across the, or each, gate when the pressure difference across the gate falls below a predetermined value.

11. A fluid coupling as claimed in claim 9 in which said duct comprises a bore which extends from said volume or volumes radially into the, or each, gate, said bore communicates with a bore in the gate extending in the direction of the race chamber, and a valve arrangement located in the gate and sensitive to pressure difference across the gate serves to connect said radial bore only to the low pressure side of the gate.

12. A fluid coupling as claimed in claim 9 in which two ducts are provided for each gate and said ducts communicate with the race chamber one on each side of the gate, each duct comprising a radial bore closable by a pressure sensitive one-way valve.

13. A fluid coupling as claimed in claim 8 in which said means comprise a valve member in the, or each gate, displaceable between two extreme positions in each of which said valve member closes the communication duct across its respective gate, and spring means arranged to urge said valve member to an unseated position where the communication duct is open.

14. A fluid pressure coupling as claimed in claim 13 in which said communication duct comprises a bore with one end counterbored to receive a compression spring, and wherein the valve member closes the open end of the counterbore against the action of a compression spring in said counterbore.

15. A fluid pressure coupling as claimed in claim 14 in which a bell crank lever is pivotally attached to the gated member adjacent the, or each gate, said bell crank lever having one arm extending substantially radially with respect to the coupling and bearing on the valve member, the other arm of the bell crank lever extending substantially circumferentially of the race chamber and being weighted whereby when the coupling is rotated, the weighted arm is subjected to centrifugal force and urges rotation of the bell crank lever to assist closure of the valve member.

16. A fluid coupling as claimed in claim 15 in which a coil compression spring acts on the weighted arm of the bell crank to urge rotation of the said lever away from a valve closure position.

17. A fluid coupling as claimed in claim 13 in which said valve member is pivotally supported by a pivot pin parallel to the rotational axis for the coupling.

18. A fluid coupling as claimed in claim 17 in which the communication duct comprises a slot through the gate in the direction of the race chamber, said valve member is pivotally supported in said slot, and said spring means comprise a coiled compression spring located in a blind bore, and acting against one end region of the valve member to urge said valve member towards a slot closure condition.

19. A fluid coupling as claimed in claim 18 in which the said valve member includes a greater mass to one side of the pivotal connection than to the other side in the circumferential direction and whereby when the coupling is rotated, the centrifugal force acting on the side of greater mass urges the valve member to a closure position.

20. A fluid coupling comprising a first member secured on a first shaft, a second member secured on a second shaft in axial alignment with said first shaft, and an annular fluid race chamber, one of said members having a vaned annulus within said fluid race chamber and the other said member presenting at least one gate in the fluid race chamber, said gate or each gate being arranged to allow the vaned annulus of the vaned member to pass relative thereto whilst obstructing the circumferential flow of fluid along the race chamber and whereby, when the race chamber is charged with fluid and the assembly is rotated, the fluid flows in the race chamber generate a pressure gradient acting circumferentially of the axis of rotation to create a pressure difference across the, or each, gate to impart rotation to the gated member, and friction shoes adapted to frictionally engage the gated member with the vaned member for mutual rotation when the rotational speed of the coupling exceeds a predetermined value.

21. A fluid coupling as claimed In claim 20 in which said friction shoes are formed on or by the said valve member.

* * * * *